(No Model.)
C. A. BARTLIFF.
NUT LOCK.
No. 479,162.  Patented July 19, 1892.
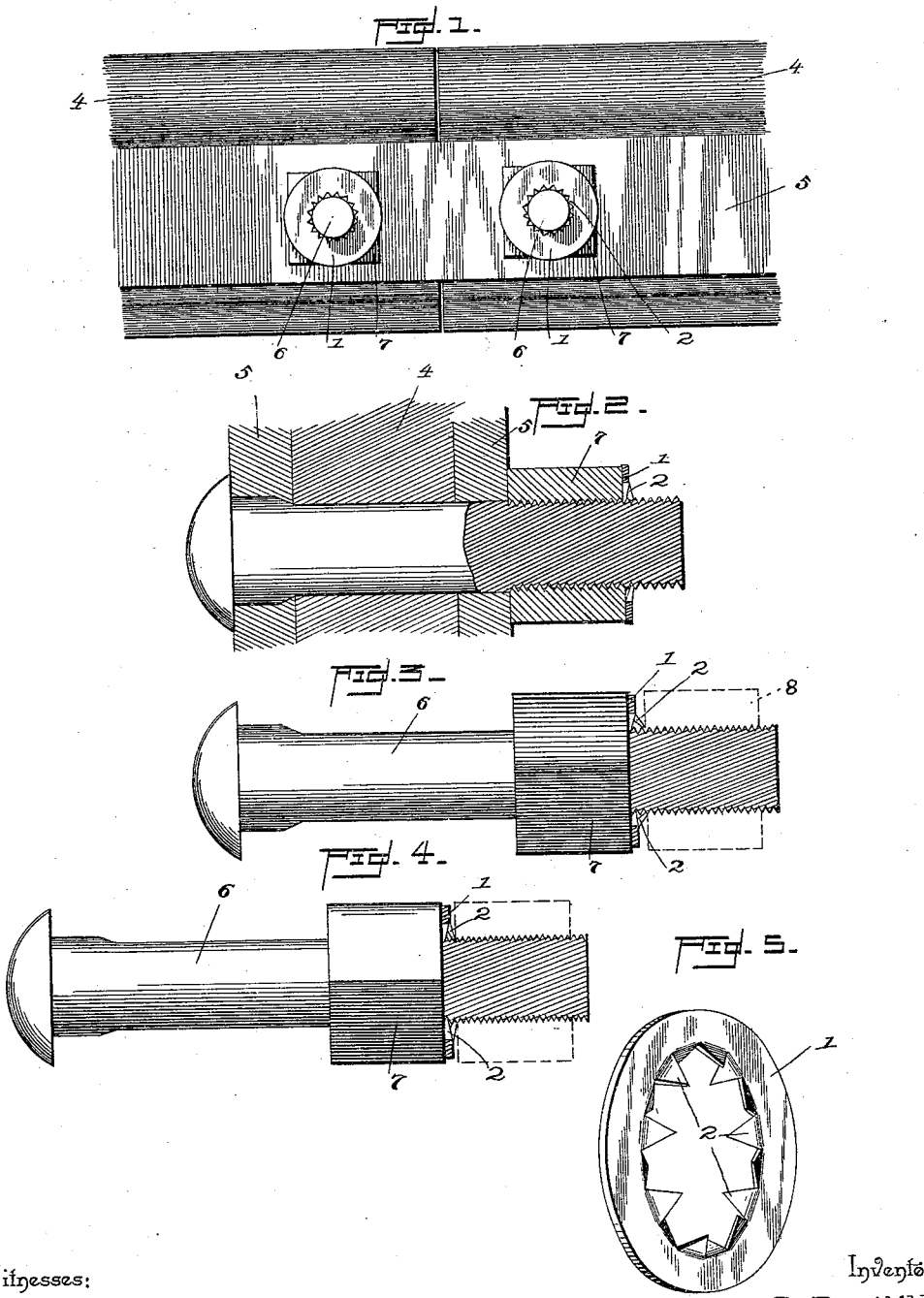
Witnesses:
E. S. Duvall Jr.
W. S. Duvall.
Inventor
Charles A. Bartliff.
By his Attorneys,
C. A. Snow & Co.

UNITED STATES PATENT OFFICE.

CHARLES A. BARTLIFF, OF MEMPHIS, TENNESSEE.

NUT-LOCK.

SPECIFICATION forming part of Letters Patent No. 479,162, dated July 19, 1892.

Application filed September 9, 1891. Serial No. 405,187. (No model.)

*To all whom it may concern:*

Be it known that I, CHARLES A. BARTLIFF, a citizen of Canada, residing at Memphis, in the county of Shelby and State of Tennessee, have invented a new and useful Nut-Lock, of which the following is a specification.

This invention has relation to improvements in nut-locks; and the objects in view are to provide an extremely cheap, durable, and thoroughly-efficient lock for nuts of the ordinary kind, and to construct said lock in such a manner that it may be applied either side first, whereby inexperienced persons may successfully lock the nut.

With the above and other objects in view the invention consists in certain features of construction hereinafter specified, and particularly pointed out in the claims.

Referring to the drawings, Figure 1 is a side elevation of a nut-lock constructed in accordance with my invention, the same being applied to the joint of a rail. Fig. 2 is a transverse section of the same. Fig. 3 is an enlarged longitudinal section of the threaded portion of the bolt, lock, or nut before the lock is set. Fig. 4 is a similar view after the lock is set. Fig. 5 is a detail perspective of the lock.

Like numerals of reference indicate like parts in all the figures of the drawings.

My lock consists of a ring 1, formed of sheet-steel, the inner periphery of the ring being notched at intervals to form a concentric and annular series of spring-teeth 2 of V shape, each alternate tooth being disposed in opposite directions, as shown, thus forming a series of teeth disposed outwardly and a series of teeth disposed inwardly.

4 designates the rail-sections, connected by the usual fish-plate 5, through which and the rail-web are passed the series of bolts 6, having the nuts 7 threaded thereon, all of the usual construction. I prefer to employ nuts having opposite flat faces; but as will hereinafter appear I may with equal advantage use the ordinary crowned nut.

The operation of the device is as follows: The nuts are first screwed home upon the bolts, after which the serrated locking-rings are placed in position against the outer faces of the nuts. A jam-nut (shown by dotted lines, Fig. 3, and indicated at 8) is then screwed tightly against the locking-ring on each bolt and has the effect of slightly compressing the serrations or spring-teeth. In this manner the inner series of teeth become wedged in between the thread on the bolt and nut and act as so many keys, and so prevent the locked nut and locking-ring from turning over the bolt, and at the same time the pressure of the upper nut will spring and press the upper teeth on the washer or nut-lock down and under the threads on the bolt, and so prevent the locking-ring lock from working up and off the bolt, and at the same time the under teeth or keys are thereby held down in place, so that after the removal of the clamping-nut aforesaid the nut on the bolt will be secured firmly in place and against any possible retrograde or upward movement.

Having described my invention, what I claim is—

1. The combination, with a bolt and its nut, of the herein-described locking-ring, fitted over the bolt and having its inner periphery provided with a series of oppositely-deflected spring-teeth, one series wedged between the thread on the bolt and nut and the other or outer series sprung under an adjacent outer thread on the bolt, substantially as specified.

2. The herein-described nut-lock, consisting of a ring adapted to fit a bolt and having its inner periphery provided with a series of spring-teeth, each alternate tooth being deflected or disposed in opposite directions and beyond the opposite sides of the ring, substantially as specified.

In testimony that I claim the foregoing as my own I have hereto affixed my signature in presence of two witnesses.

CHARLES A. BARTLIFF.

Witnesses:
E. W. TROUT,
L. E. WOOTEN.